(12) United States Patent
Richardson et al.

(10) Patent No.: US 8,205,641 B2
(45) Date of Patent: Jun. 26, 2012

(54) HYDRAULIC APPARATUS HAVING AN AXIALLY ACTUATABLE BYPASS VALVE

(75) Inventors: Jason Scot Richardson, Chuckey, TN (US); Robert Allan Manbert, Guyton, GA (US); Matthew Herman Simon, Kalamazoo, MI (US)

(73) Assignee: Parker-Hannifin Corporation, Cleveland, OH (US)

( * ) Notice: Subject to any disclaimer, the term of this patent is extended or adjusted under 35 U.S.C. 154(b) by 496 days.

(21) Appl. No.: 12/543,561

(22) Filed: Aug. 19, 2009

(65) Prior Publication Data

US 2010/0043901 A1    Feb. 25, 2010

Related U.S. Application Data

(60) Provisional application No. 61/089,968, filed on Aug. 19, 2008.

(51) Int. Cl.
*F16K 11/16* (2006.01)
*F16K 15/18* (2006.01)

(52) U.S. Cl. .................. 137/883; 137/523; 137/881

(58) Field of Classification Search .............. 137/523, 137/871, 881, 883
See application file for complete search history.

(56) References Cited

U.S. PATENT DOCUMENTS

| | | | |
|---|---|---|---|
| 2,389,274 A | 2/1941 | Pearsall, Jr. et al. | |
| 2,320,686 A | 3/1941 | Waseige | |
| 2,669,330 A | 2/1954 | Banker | |
| 2,726,898 A * | 12/1955 | Henriksson | 239/444 |
| 2,750,115 A | 6/1956 | Greenamyer | |
| 2,779,347 A | 1/1957 | Munroe | |
| 2,879,801 A | 3/1959 | Cornelius | |
| 3,239,012 A | 3/1966 | Bunting et al. | |
| 3,411,295 A | 11/1968 | Byers, Jr. | |
| 3,788,352 A * | 1/1974 | Ane et al. | 137/523 |
| 3,920,042 A * | 11/1975 | Blatt | 137/523 |
| 3,935,108 A | 1/1976 | Forgues | |
| 4,063,618 A | 12/1977 | O'Dell | |
| 4,644,972 A * | 2/1987 | Perrott | 137/883 |
| 4,932,209 A | 6/1990 | Okada et al. | |
| 4,986,074 A | 1/1991 | Hahmann et al. | |
| 5,119,632 A | 6/1992 | Nishimura et al. | |
| 5,146,748 A | 9/1992 | Okada | |
| 6,098,654 A | 8/2000 | Cohen et al. | |
| 6,116,277 A | 9/2000 | Wilcox et al. | |
| 6,185,936 B1 | 2/2001 | Hauser et al. | |
| 6,374,604 B1 | 4/2002 | Poplawski et al. | |
| 6,502,394 B2 | 1/2003 | Trimble | |
| 6,612,400 B2 | 9/2003 | Bravo | |
| 6,651,427 B1 | 11/2003 | Poplawski et al. | |
| 6,694,729 B1 | 2/2004 | Trimble | |
| 6,804,958 B1 | 10/2004 | Poplawski et al. | |
| 6,840,276 B2 | 1/2005 | Zeiber et al. | |

(Continued)

*Primary Examiner* — John Fox
(74) *Attorney, Agent, or Firm* — David J. Whitman; Robert J. Clark (57) ABSTRACT

A hydraulic apparatus includes a housing portion having two main conduits and a central conduit. Valves are supported in the housing portion. At least one valve is interposed between each main conduit and the central conduit. Each of the valves has a closed position for preventing a free flow of fluid between the central conduit and its associated main conduit and have an open position for enabling the free flow of fluid between the central conduit and its associated main conduit. The hydraulic apparatus also includes a bypass valve assembly having a plunger portion that extends into the central conduit. The plunger portion is movable in an axial direction for moving the valves from the closed position to the open position.

19 Claims, 6 Drawing Sheets

U.S. PATENT DOCUMENTS

| | | |
|---|---|---|
| 6,889,595 B1 | 5/2005 | Trimble |
| 7,007,467 B1 | 3/2006 | Hauser et al. |
| 7,028,708 B1 | 4/2006 | Langenfeld et al. |
| 7,066,199 B1 | 6/2006 | Trimble et al. |
| 7,082,762 B1 | 8/2006 | Trimble |
| 7,111,459 B1 | 9/2006 | Brookens et al. |
| 7,174,712 B1 | 2/2007 | Brookens et al. |
| 7,198,060 B2 | 4/2007 | Hiser |
| 7,275,371 B1 | 10/2007 | Hauser et al. |
| 7,320,217 B2 | 1/2008 | Yasuda et al. |
| 7,320,334 B1 | 1/2008 | Trimble et al. |
| 7,367,353 B1 | 5/2008 | Langenfeld et al. |
| 7,513,809 B2 | 4/2009 | Kubinski |
| 7,568,497 B1 | 8/2009 | Langenfeld et al. |

* cited by examiner

HYDRAULIC APPARATUS HAVING AN AXIALLY ACTUATABLE BYPASS VALVE

CROSS REFERENCE TO RELATED APPLICATIONS

The present application claims the benefit of the filing date of U.S. Provisional Patent Application Ser. No. 61/089,968, filed Aug. 19, 2008, the disclosure of which is incorporated herein by reference in its entirety.

TECHNICAL FIELD

This invention relates to a hydraulic apparatus having an axially actuatable bypass valve assembly.

BACKGROUND

It is common to provide a hydraulic apparatus, such as a hydraulic pump, hydraulic motor, or integrated hydraulic transmission (i.e., a hydraulic pump and hydraulic motor in the same assembly), with a bypass valve. The bypass valve is actuatable between a normal mode condition and a bypass mode condition. In the normal mode condition, the bypass valve prevents a free flow of fluid between the pressure conduits and a central conduit of the hydraulic apparatus. In the bypass mode condition, the bypass valve enables the free flow of fluid between the pressure conduits and the central conduit of the hydraulic apparatus.

Bypass valves are common when the hydraulic apparatus forms part of a vehicle propulsion system. For example, when the hydraulic apparatus is a hydraulic pump of a hydrostatic transmission for a turf machine, actuating the bypass valve to the bypass mode condition enables towing of the turf machine, i.e., movement of the turf machine under a power other than its own, as the flow of fluid resulting from the movement of the wheels of the turf machine flows freely (or with little resistance) between the conduits of the pump. When the bypass valve is in the normal mode condition, towing of the turf machine is extremely difficult. Any movement of the vehicle results from fluid flowing through small gaps formed in the hydraulic apparatus as a result of manufacturing tolerances, such as, e.g., very small gaps located between the pistons and the bores in a piston pump.

One known hydraulic apparatus is a hydraulic pump having an end block with a central conduit interposed between first and second pressure conduits. A first valve is located between the central conduit and the first pressure conduit and may be opened, for example, in response to pressure spikes, to fluidly connect the central conduit and the first pressure conduit. Similarly, a second valve is located between the central conduit and the second pressure conduit and may be opened, for example, in response to pressure spikes, to fluidly connect the central conduit and the second pressure conduit. A bypass valve is located in the central conduit and includes a lobed portion that is interposed between the first and second valves. The bypass valve is rotated by ninety degrees between its normal mode condition, in which the lobed portion is spaced away from the first and second valves, and a bypass mode condition, in which the lobed portion of the bypass valve engages and opens the first and second valves.

SUMMARY OF THE INVENTION

According to one embodiment of the invention, a hydraulic apparatus comprises a housing portion having two main conduits and a central conduit. Valves are supported in the housing portion. At least one valve is interposed between each main conduit and the central conduit. Each of the valves has a closed position for preventing a free flow of fluid between the central conduit and its associated main conduit and have an open position for enabling the free flow of fluid between the central conduit and its associated main conduit. The hydraulic apparatus also includes a bypass valve assembly having a plunger portion that extends into the central conduit. The plunger portion is movable in an axial direction for moving the valves from the closed position to the open position.

In an exemplary embodiment, the plunger portion has a frustoconical outer surface portion for engaging the valves. Axial movement of the plunger portion results in the frustoconical outer surface forcing the valves from the closed position to the open position.

One exemplary embodiment of the hydraulic apparatus also includes a lever arm. The lever arm is associated with the plunger portion and, pivotal movement of the lever arm moves the plunger portion axially for moving the valves from the closed position to the open position. In another embodiment, the bypass valve assembly is adapted for connection to a linking device for enabling remote actuation of the bypass valve assembly.

In another embodiment, the bypass valve assembly includes separate inner and outer portions. The inner portion includes the plunger portion and, the outer portion is actuatable to move the inner portion.

In yet another embodiment, the central conduit receives charge fluid. The bypass valve assembly further includes a charge relief assembly adapted to relieve charge pressure from the central conduit.

DETAILED DESCRIPTION OF THE DRAWINGS

Figure 1:
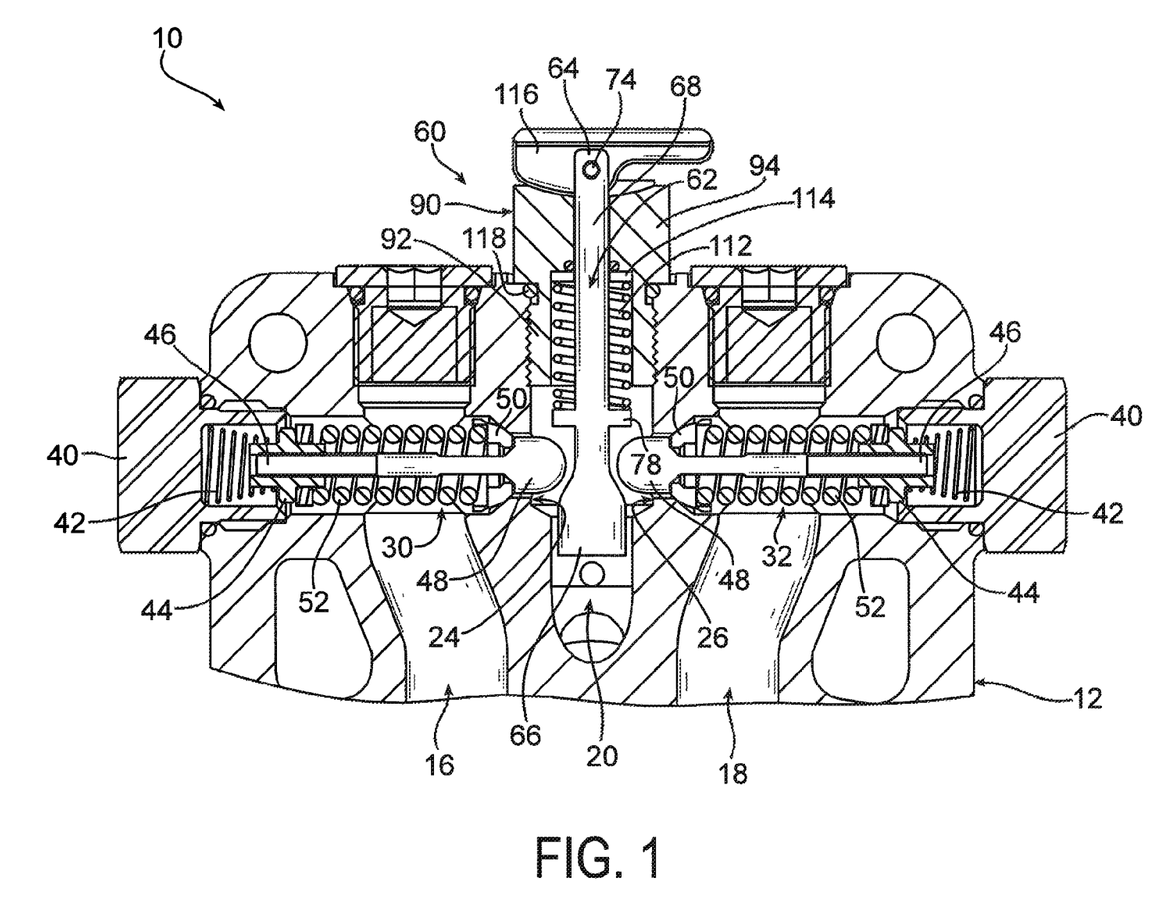
FIG. 1 is a partial cross-sectional view of a hydraulic apparatus constructed in accordance with the present invention and illustrating a bypass valve assembly in a normal mode condition.

FIG. 1 is a partial cross-sectional view of a hydraulic apparatus 10, such as a hydraulic pump, a hydraulic motor, or integrated hydrostatic transmission, constructed in accordance with the present invention. The hydraulic apparatus 10 includes a housing portion. The housing portion illustrated in FIG. 1 is an end block 12. End block 12 includes two main conduits 16 and 18 and a central conduit 20 that is interposed between the main conduits. In the illustrated embodiment, the central conduit 20 is in fluid communication with and receives fluid from a charge pump (not shown). Alternatively, the central conduit 20 could draw fluid from a reservoir for makeup flow. A first flow passage 24 connects the central conduit 20 with main conduit 16 and, a second flow passage 26 connects the central conduit 20 with main conduit 18.

The hydraulic apparatus 10 illustrated in FIG. 1 also includes a pair of valves 30 and 32. The valves 30 and 32 illustrated in FIG. 1 are combination check/pressure relief valves. Alternatively, valves 30 and 32 may be check valves. Valve 30 is associated with and is located in the first flow passage 24. Valve 32 is associated with and is located in the second flow passage 26. The valves 30 and 32 illustrated in FIG. 1 include a spring cap 40 that is adapted to be threadedly received in the end block 12 and within which a check valve spring 42 is located. The check valve spring 42 is a compression spring that acts between the spring cap 40 and a spring seat 44 that is affixed to a valve stem 46. A head portion 48 of the valve stem 46 is located on an end opposite the spring seat 44. FIG. 1 illustrates the head portion 48 of each valve stem 46 of each valve 30 and 32 extending into the central conduit 20. An annular valve poppet 50 is received on the valve stem 46 and is movable on the valve stem. When valves 30 and 32 are check valves, the valve stem, including the head portion, may be integral with the valve poppet. A relief spring 52 is interposed between the spring seat 44 and the valve poppet 50 for biasing the valve poppet against the head portion 48 of the valve stem 46.

The valves 30 and 32 each have a closed position in which the valve poppet 50 engages a portion of the end block 12 and the head portion 48 of the valve stem 46 engages the valve poppet 50. When the valves 30 and 32 are in the closed position, the free flow of fluid between the main conduits 16 and 18 and the central conduit 20 is prevented. It is noted that a small orifice in the valve poppet 50 or in the valve stem 46 of each valve 30 and 32 may allow a restricted flow of fluid between the respective main conduits 16 and 18 and the central conduit 20 when the valves are in the closed position. Each valve 30 and 32 also has two open positions for enabling a flow of fluid through the respective first and second flow passage 24 and 26 between the associated main conduits 16 and 18 and the central conduit 20. Each valve 30 and 32 operates as a check valve when a differential between fluid pressure in the central conduit 20 and the associated main conduit 16 and 18 is sufficient to overcome the biasing force of the check valve spring 42. When operating as a check valve, the valve stem 46 and valve poppet 50 move together toward the spring cap 40. Each valve 30 and 32 operates as a pressure relief valve when a differential between fluid pressure in the associated main conduit 16 and 18 and the central conduit 20 is sufficient to overcome the bias of the relief spring 52. When operating as a pressure relief valve, the head portion 48 of the valve stem 46 moves away from the valve poppet 50 and into the central conduit 20.

Figure 2:
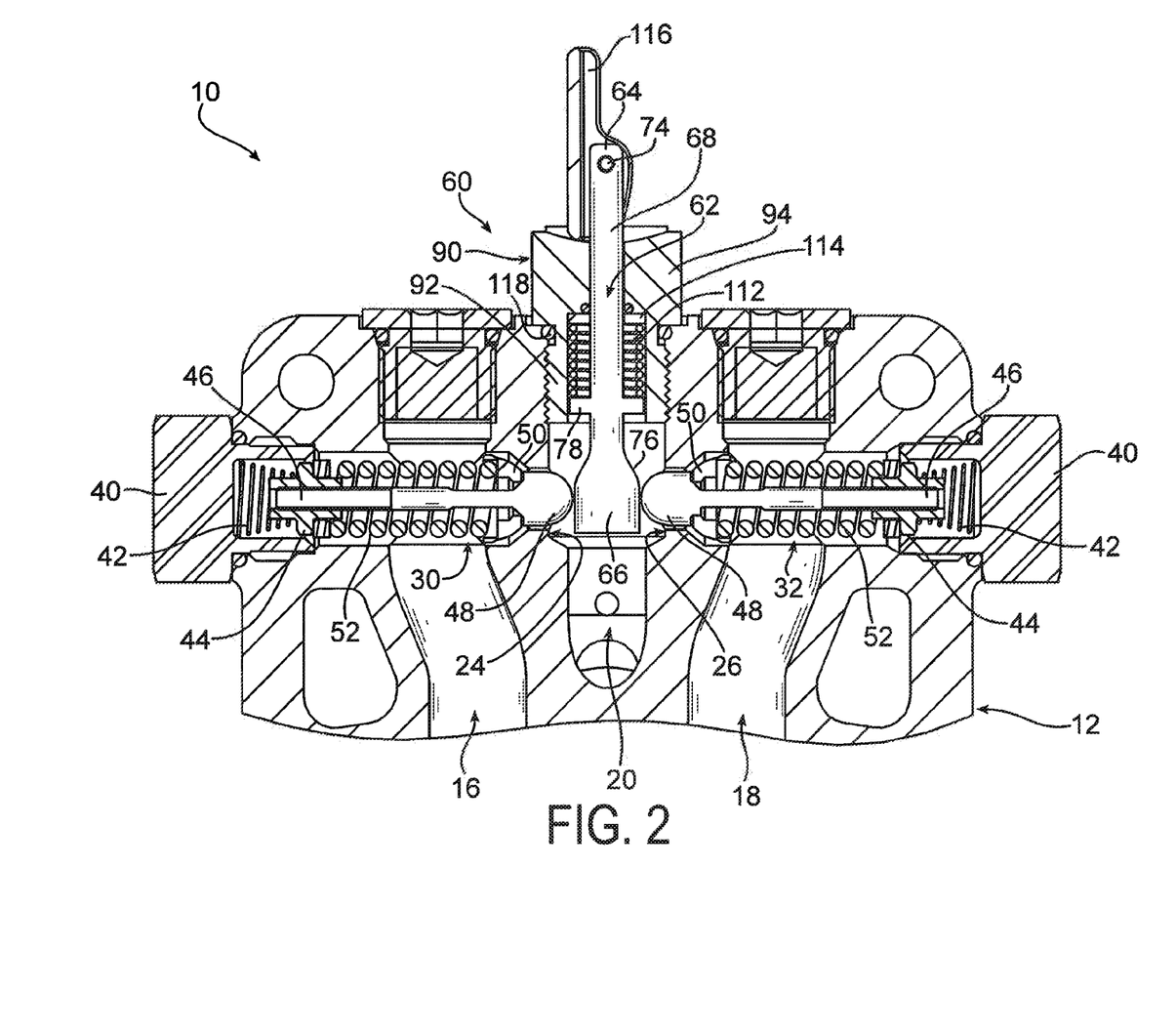
FIG. 2 illustrates the hydraulic apparatus of FIG. 1 with the bypass valve assembly in a bypass mode condition.
Figure 3:
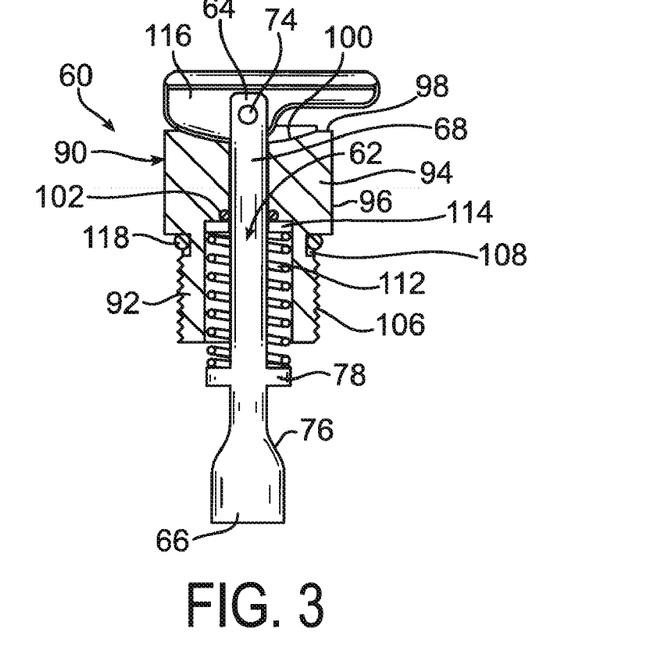
FIG. 3 is an elevation view of the bypass valve assembly illustrated in FIG. 1.

The hydraulic apparatus 10 of FIG. 1 also includes an axially actuatable bypass valve assembly 60. One embodiment of the axially actuatable bypass valve assembly 60 is illustrated in FIG. 3. FIG. 3 illustrates the bypass valve assembly 60 in an unactuated or normal mode condition. FIG. 1 illustrates the bypass valve assembly 60 in the normal mode condition assembled in the end block 12 of the hydraulic apparatus 10. FIG. 2 illustrates the bypass valve assembly 60 assembled in the end block 12 of the hydraulic apparatus 10 and in an actuated or bypass mode condition.

The bypass valve assembly 60 of FIG. 3 is a flip lever type bypass valve assembly. The bypass valve assembly 60 includes an elongated plunger portion 62 having opposite first and second ends 64 and 66, respectively. An elongated shaft 68 extends between the first and second ends 64 and 66 of the plunger portion 62. A through-hole for receiving a pin 74 extends through the first end 64 of the plunger portion 62. The second end 66 of the plunger portion 62 has a wider outer diameter than the shaft 68. FIG. 3 illustrates the widened second end 66 having a diameter that is approximately twice the diameter as the shaft 68. A frustoconical outer surface portion 76 (FIG. 3) provides a transition from the shaft 68 to the widened second end 66. A spring seat 78 is located on the shaft 68 intermediate the first and second ends 64 and 66 of the plunger portion 62. In the illustrated embodiment, the spring seat 78 is located between a mid-point of the plunger portion 62 and the widened second end 66.

The bypass valve assembly 60 also includes a plug portion 90. The plug portion 90 is a one-piece structure that includes a tubular portion 92 and a closed end portion 94. The closed end portion 94 of the plug portion 90 includes a generally hexogonal outer surface 96 (FIG. 3). An upper surface 98 of the closed end portion 94 includes a concave indentation 100. A bottom of the closed end portion 94 includes a tapered recess (not shown) for receiving an o-ring 102. A passage extends axially through the closed end portion 94 and is coaxial with the tubular portion 92. An outer surface 106 (FIG. 3) of the tubular end portion 92 has a diameter that is slightly smaller than that of the cylindrical outer surface 96 of the closed end portion and may include threads for enabling the plug portion 90 to be threadedly attached to the end block 12. An o-ring groove 108 is located between the outer surface 106 of the tubular portion 92 and the cylindrical outer surface 96 of the closed end portion 94.

The bypass valve assembly 60 also includes a spring 112, a washer 114, a lever arm 116 and an o-ring 118. The spring 112 is a helical spring having an inner diameter sized for receiving the shaft 68 of the plunger portion 62 and having an outer diameter sized for being received in the tubular portion 92 of the plug portion 90. The washer 114 is flat and annular. The washer 114 has an inner diameter that is sized receiving the shaft 68 of the plunger portion 62 and an outer diameter that is sized for being received in the tubular portion 92 of the plug portion 90 and engaging an end of the spring 112. O-ring 102 seats against the shaft 68 of the plunger portion 62 and is located between the closed end portion 94 of the plug portion 90 and the washer 114. O-ring 118 is sized for being received in the o-ring groove 108. When the plug portion 90 is assembled into the end block 12, as shown in FIGS. 1 and 2, the o-ring 118 seals between the plug portion 90 and the end block 12.

One method for assembling the bypass valve assembly 60 includes inserting o-ring 118 into o-ring groove 108. Next, o-ring 102 is inserted into a tapered recess and then the washer 114 is inserted into the tubular end portion 92 and pressed against the o-ring 102. The spring 112 is inserted into the tubular end portion 92 and is seated against the washer 114. The first end 64 of the plunger portion 62 is then inserted through the spring 112, the washer 114, the o-ring 102, and the passage of the plug portion 90 until the spring 112 rests upon the spring seat 78 of the plunger portion 62 and the first end 64 of the plunger portion extends beyond the upper surface 98 of the closed end portion 94. Lastly, the lever arm 116 is connected to the first end 64 of the plunger portion 62 using the pin 74.

FIG. 1 illustrates the bypass valve assembly 60 assembled in the end block 12 and in a normal mode condition. When in the normal mode condition, the widened second end 66 of the plunger portion 62 is located below the valves 30 and 32, as viewed in FIG. 1, and the shaft 68 is interposed between the valves. The bypass valve assembly 60 is actuated from the normal mode condition to the bypass mode condition by pivoting the lever arm 116 about the pin 74 by approximately ninety degrees. When the lever arm 116 is pivoted, an arcuate surface of the lever arm 116 moves in a cam-like manner over the concave indentation 100 of the top surface 98 of the closed end portion 94 of the plug portion 90. This cam-like movement acts to move the plunger portion 62 in an axial direction, upward as viewed in FIG. 1, against the bias of the spring 112. During its upward movement, the frustoconical outer surface portion 76 of the plunger portion 62 simultaneously engages the head portions 48 of the valves 30 and 32 and, further axial movement of the plunger portion 62 brings the widened second end 66 of the plunger portion into engagement with the head portions 48 of the valves 30 and 32. Movement of the head portions 48 of the valves 30 and 32 from the frustoconical outer surface portion 76 to the widened second end 66 forces the valve stems 46 of the valves 30 and 32 to move toward their respective spring caps 40. This movement of the valves 30 and 32 is orthogonal relative to the axial movement of the plunger portion 62. When the valve stems 46 of the valves 30 and 32 move toward their respective spring caps 40, the valve poppets 50 of the valves 30 and 32 are moved away from engagement with the end block 12. As a result, fluid may freely flow between the main conduits 16 and 18 and the central conduit 20 via the flow passages 24 and 26.

When the lever arm 116 is moved to the ninety degree position illustrated in FIG. 2, the bypass valve assembly 60 locks in the bypass mode condition. The lever arm 116 resists any biasing force of the spring 112 and the plunger portion 62 remains in the illustrated position. When the lever arm 116 is moved to a position less than ninety degrees, the biasing force of the spring 112 acts to force the plunger portion 62 away from the plug portion 90 and, the bypass valve assembly 60 returns to the normal mode condition illustrated in FIG. 1.

Figure 4:
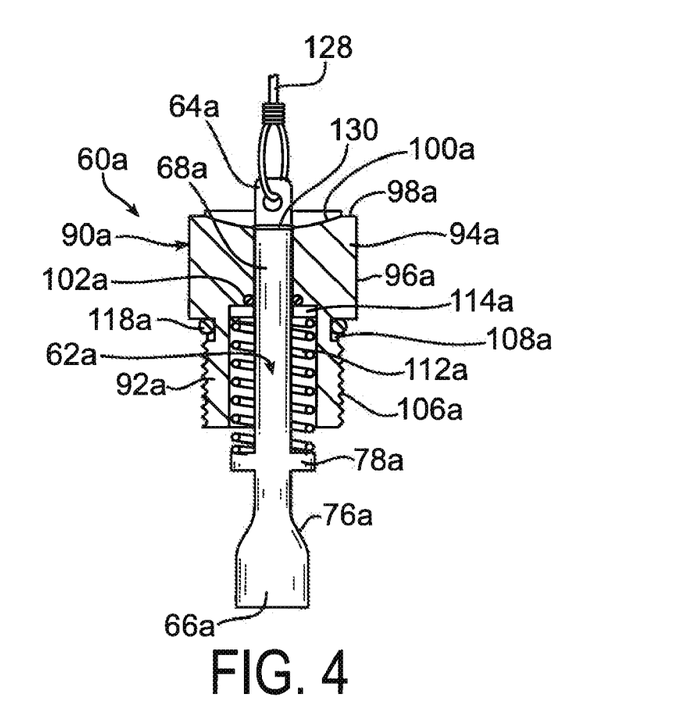
FIG. 4 is an alternative construction of a bypass valve assembly.

FIG. 4 illustrates an alternate embodiment of a bypass valve assembly 60a for use in a hydraulic apparatus. Structures of the bypass valve assembly 60a of FIG. 4 that are the same as or similar to those described with reference to FIGS. 1-3 are labelled with the same reference number with the addition of the suffix "a". The bypass valve assembly 60a of FIG. 4 does not include the lever arm 116 or the pin 74 described with reference to FIG. 3. Instead, a linking device, such as a cable 128, linkage or other mechanism, for enabling the remote actuation of the bypass valve assembly 60a is attachable to the first end 64a of the plunger portion 62a via the through-hole. Alternatively, a linking device may be connected to the lever arm 116 of FIG. 3 for causing pivotal movement of the lever arm. FIG. 4 also illustrates a retaining clip 130 that is attached to the shaft 68a of the plunger portion 62a adjacent the first end 64a for maintaining the plunger portion relative to the plug portion 90a.

Figure 5:
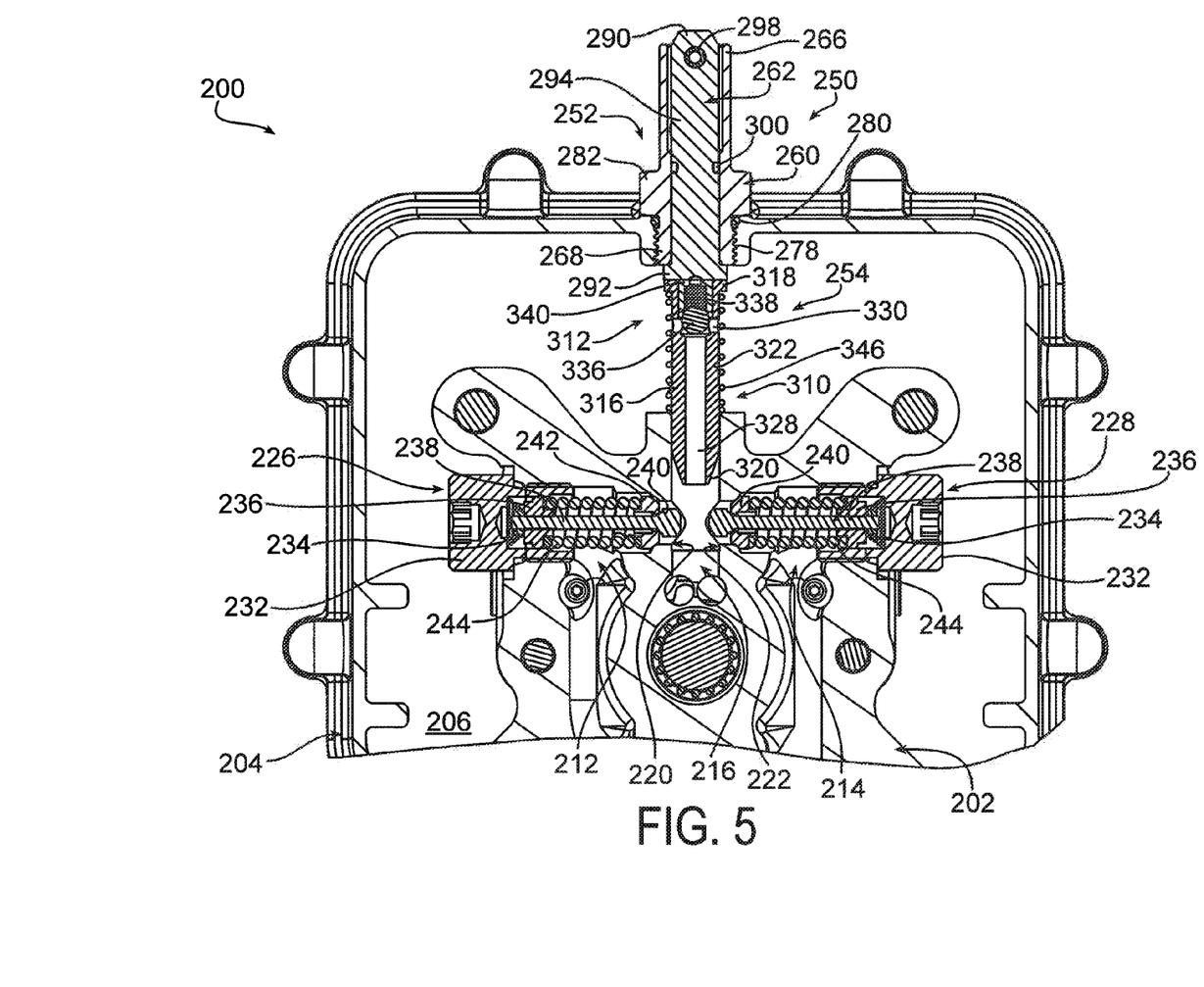
FIG. 5 is a partial cross-sectional view of a second embodiment of a hydraulic apparatus constructed in accordance with the present invention and illustrating a bypass valve assembly in a normal mode condition.

FIG. 5 is a partial cross sectional view of a second embodiment of a hydraulic apparatus 200 constructed in accordance with the present invention. The hydraulic apparatus 200 includes an end block section 202 that is located within an outer housing 204. The housing 204 includes an internal reservoir 206. FIG. 5 illustrates the end block section 202 located in the reservoir 206.

The end block section 202 includes two main conduits 212 and 214 and a central conduit 216 that is interposed between the main conduits. A first flow passage 220 connects the central conduit 216 with main conduit 212 and, a second flow passage 222 connects the central conduit 216 with main conduit 214. The hydraulic apparatus 200 also includes a pair of valves 226 and 228. The valves 226 and 228 illustrated in FIG. 5 are similar to the valves 30 and 32 described previously with reference to FIG. 1. Each valve 226 and 228 includes a spring cap 232 that is adapted to be threadedly received in the end block portion 202. Each valve 226 and 228 also includes a check valve spring 234 that acts between the spring cap 232 and a spring seat 236 of the respective valve. Each valve 226 and 228 also includes a valve stem 238 having a head portion 240. The spring seat 236 is affixed to the valve stem 238 on an end opposite the head portion 240. The valve stem 238 also supports an annular valve poppet 242. A relief spring 244 is interposed between the spring seat 236 and the valve poppet 242 and tends to force the valve poppet 242 toward the head portion 240 of the valve stem 238.

The valves 226 and 228 each have a closed position in which the valve poppet 242 engages the end block section 202 and the head portion 240 of the valve stem 238 engages the valve poppet 242. When the valves 226 and 228 are in the closed position, the free flow of fluid between the main conduits 212 and 214 and the central conduit 216 is prevented. It is noted that a small orifice in the valve poppet 242 or the valve stem 238 of each valve 226 and 228 may allow a restricted fluid flow between the respective main conduit 212 and 214 and the central conduit 216 when the valves are in the closed position. Each valve 226 and 228 also has two open positions for enabling a free flow of fluid through the respective flow passage 220 and 222 between the main conduit 212 and 214 and the central conduit 216. Each valve 226 and 228 operates as a check valve when a differential between fluid pressure in the central conduit 216 and the associated main conduit 212 and 214 is sufficient to overcome the biasing force of the check valve spring 234. When the biasing force of the check valve spring 234 is overcome, the valve stem 238 and the poppet 242 move toward spring cap 232. Each valve 226 and 228 operates as a pressure relief valve when a differential between fluid pressure in the associated main conduit 212 and 214 and the central conduit 216 is sufficient to overcome the biasing force of the relief spring 244. When the biasing force of the relief spring 244 is overcome, the head portion 240 of the valve stem 238 moves away from the valve poppet 242 and into the central conduit 216. As shown in FIG. 5, when the valves 226 and 228 are in the closed position, the head portions 240 of the valves 226 and 228 extend into central conduit 216.

Figure 7:
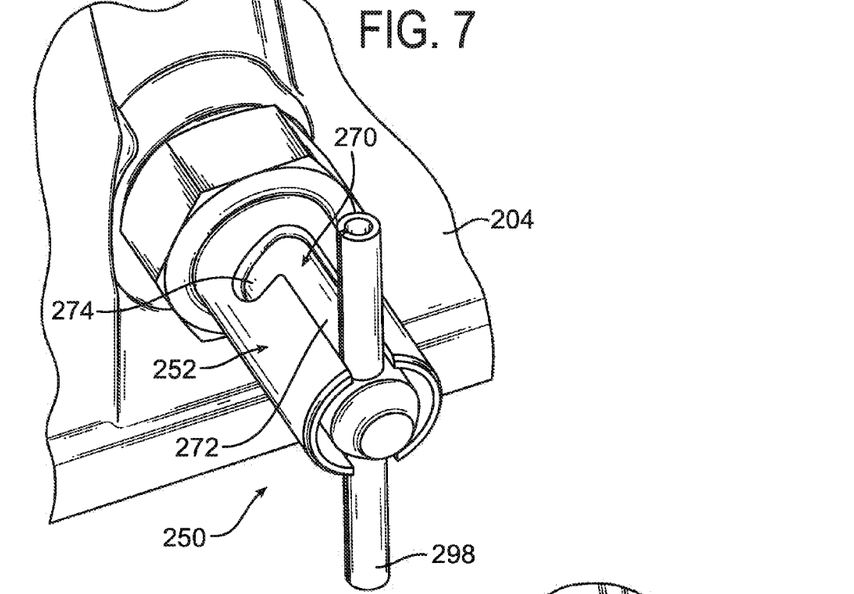
FIG. 7 is a perspective view illustrating a portion of the bypass valve assembly illustrated in FIG. 5 in the normal mode condition.

The hydraulic apparatus 200 of FIG. 5 also includes an axially actuatable bypass valve assembly 250. The bypass valve assembly 250 of FIG. 5 includes separate outer and inner portions 252 and 254, respectively. The outer portion 252 of the bypass valve assembly 250 is adapted to be affixed to the housing 204. The outer portion 252 includes a plug portion 260 and a plunger portion 262. The plug portion 260 is generally tubular and includes axially opposite first and second ends 266 and 268, respectively. Diametrically opposite L-shaped slots 270 are located in a first end 266 of the plug portion 260. FIG. 7 illustrates a perspective view of the plug portion 260 including one of the L-shaped slots 270. The L-shaped slots 270 include an axial extending portion 272 and a radial extending portion 274. As opposed to a right angle, an acute angle may separate the axial extending portion 272 and the radial extending portion 274. A second end 268 of the plug portion 260 includes external threads 278 for enabling the plug portion to be threadedly attached to the housing 204. An o-ring groove for receiving an o-ring 280 extends into the plug portion 260 immediately adjacent the external threads 278. A large diameter boss portion for engaging with an outer surface of the housing 204 is located immediately adjacent the o-ring groove on a side opposite the external threads 278. When the plug portion 260 is threadedly attached to the housing 204, the o-ring 280 is located in the o-ring groove for sealing between the housing 204 and the plug portion 260.

The plug portion 260 also includes an axially extending through passage that is adapted to receive the plunger portion 262 of the outer portion 252 of the bypass valve assembly 250.

The plunger portion 262 of the bypass valve assembly 250 is elongated and has axially opposite first and second ends 290 and 292, respectively. An elongated shaft 294 extends between the first and second ends 290 and 292 of the plunger portion 262. The first end 290 of the plunger portion 262 includes a radially extending through-hole adapted to receive a locking pin 298 of the outer portion 252 of the bypass valve assembly 250. The second end 292 of the plunger portion 262 includes a radially extending flange. An o-ring groove for receiving an o-ring 300 extends into the shaft 294 of the plunger portion 262 in a location intermediate the first and second ends 290 and 292.

To assemble the outer portion 252 of the bypass valve assembly 250, the o-ring 300 is positioned in the o-ring groove of the plunger portion 262. The plunger portion 262 then is inserted into the plug portion 260 such that the through-hole located in the first end 290 of the plunger portion 262 aligns with the axial extending portion 272 of the L-shaped slots 270. A locking pin 298 is positioned through the through-hole in the first end 290 of the plunger portion 262 and is affixed to the plunger portion. The o-ring 280 is positioned in o-ring groove. The outer portion 252 of the bypass valve assembly 250 then is ready for threaded engagement with the housing 204.

The inner portion 254 of the bypass valve assembly includes both a bypass actuation portion 310 and a charge relief assembly 312. The bypass actuation portion 310 includes an elongated plunger portion 316. The plunger portion 316 includes axially opposite first and second ends 318 and 320, respectively. An elongated shaft 322 extends between the first and second ends 318 and 320 of the plunger portion 316. The first end 318 of the plunger portion 316 includes a radially outwardly extending flange. A counter-bore extends axially into a first end 318 of the plunger portion 316. A through-bore 328 extends from a bottom surface of the counter-bore, axially through the shaft 322 and exits the plunger portion at the second end 320. The second end 320 of the plunger portion 316 has a frustoconical outer surface portion. The frustoconical outer surface portion is narrow at the second end 320 of the plunger portion 316 and widens as it extends towards the first end 318. The plunger portion 316 of the inner portion 254 also includes a radially extending cross-bore 330 that extends through the plunger portion and intersects the counter-bore 328.

Figure 6:
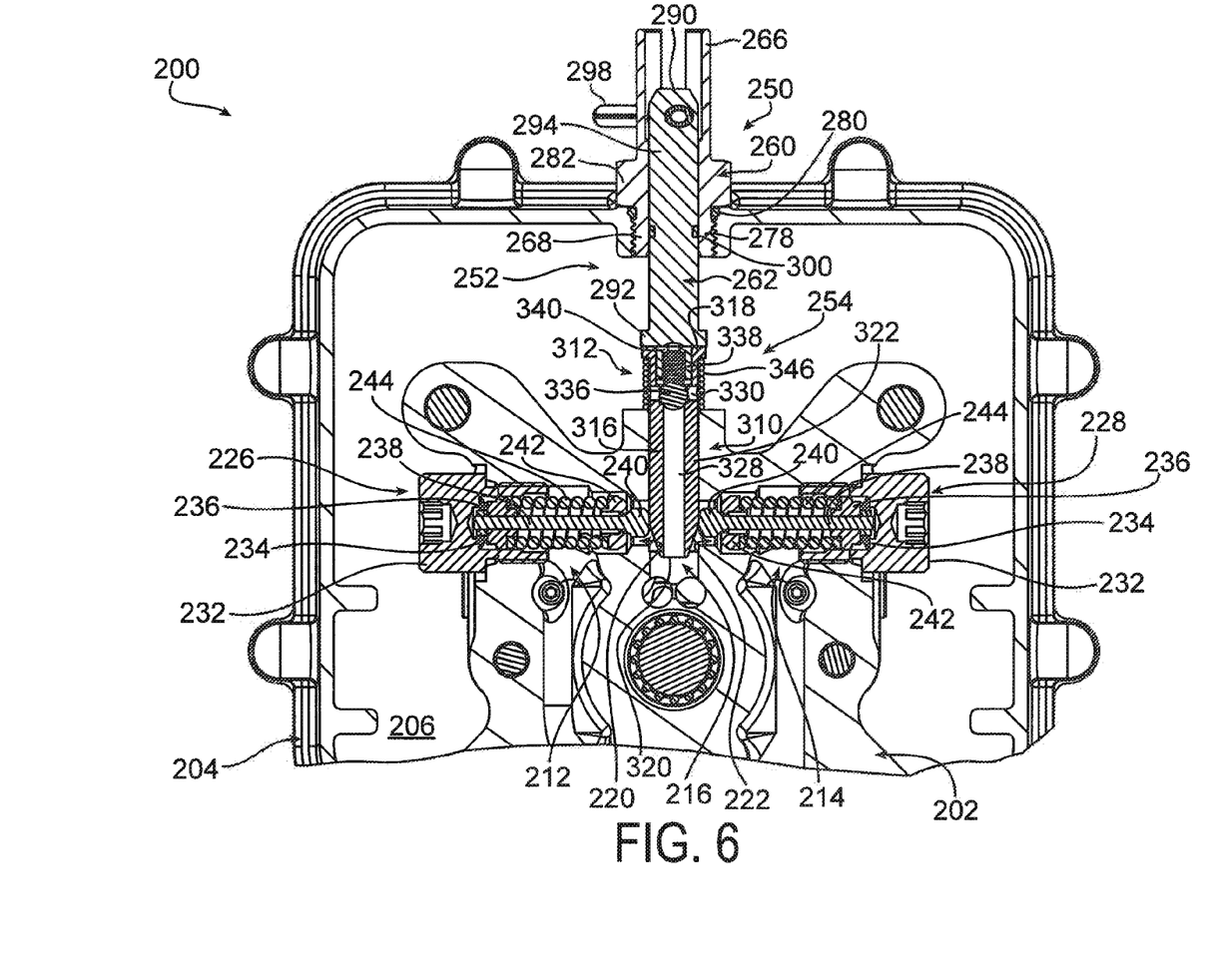
FIG. 6 illustrates the hydraulic apparatus of FIG. 5 with the bypass valve assembly in a bypass mode condition.

The charge relief assembly 312 of the inner portion 254 of the bypass valve assembly 250 includes a poppet portion 336, a spring 338 and a spring retainer 340. Although the poppet portion 336 is illustrated as a ball, those skilled in the art should recognize that other types of poppets may be used, including conical and disk shaped poppets. The spring retainer 340 is sized to fit in the counter-bore at the first end 318 of the plunger portion 316. The charge relief assembly 312 is assembled into the plunger portion 316 and receives fluid through the through-bore 328. To assemble the charge relief assembly 312 into the plunger portion 316, the poppet portion 336 is inserted into the counter-bore and is located at the intersection of the cross-bore 330 and the through-bore 328, as is illustrated in FIG. 6. The spring 338 is then inserted into the spring retainer 340 and, the spring retainer 340 is press fit, or otherwise affixed, to the plunger portion 316 in the counter-bore.

The inner portion 254 of the bypass valve assembly 250 also includes a helical compression spring 346. The spring 346 is sized to be received about the shaft 294 of the plunger portion 316 and to engage the radially outwardly extending flange of the first end 318 of the plunger portion 316. When the second end 320 of the plunger portion 316 is inserted into the central conduit 216 of the end block portion 202, as illustrated in FIGS. 5 and 6, the spring 346 tends to bias the plunger portion 316 away from the valves 226 and 228 and into the position illustrated in FIG. 5.

To assemble the bypass valve assembly 250 into the hydraulic apparatus 200, the inner portion 254 of the bypass valve assembly 250 is assembled and the second end 320 of the plunger portion 316 is inserted into the central conduit 216 of the end block portion 202. The assembled outer portion 252 of the bypass valve assembly 250 then is attached to the housing 204 such that the plunger portion 262 of the outer portion 252 is brought into engagement with the plunger portion 316 of the inner portion 254. FIG. 5 illustrates the bypass valve assembly 250 assembled into the hydraulic apparatus 200 and in a normal mode condition. In the normal mode condition, the second end 320 of the plunger portion 316 of the inner portion 254 is spaced away from the head portions 240 of the valves 226 and 228.

The bypass valve assembly 250 of FIG. 5 is formed as two separate portions, i.e. the inner portion 254 and the outer portion 252, to compensate for tolerances in the manufacture and assembly of the hydraulic apparatus 200. In assembling the hydraulic apparatus 200, it is extremely difficult to position the end block section 202 relative to the housing 204 such that the central conduit 216 aligns coaxially with the opening in the housing for receiving the plug portion 260 of the bypass valve assembly 250. To allow for a slight misalignment of the central conduit 216 and the opening in the housing 204, the bypass valve assembly 250 includes two separate portions 252 and 254 designed to interact with one another. As a result, the inner portion 254 and the outer portion 252 may be slightly misaligned (not coaxial with one another) relative to one another and still operate in its intended manner.

When the hydraulic apparatus 200 is operating with the bypass valve assembly 250 in the normal mode condition, the charge pump (not shown) provides fluid to the central conduit 216 at a pressure, typically below 100 psi. The fluid in the central conduit 216 passes through the through-bore 328 in the plunger portion 316 of the inner portion 254 and acts on the poppet portion 336 of the charge relief assembly 312. When the charge pressure exceeds a predetermined amount, the poppet portion 336 moves upwardly, as viewed in FIG. 5, toward the spring retainer 340 and away from the intersection of the through-bore 328 and the cross-bore 330. This movement of the poppet portion 336 away from the intersection of the through-bore 328 and the cross-bore 330 enables the flow of charge fluid out of the central conduit 216 via the through-bore 328 and the cross-bore 330. The fluid exiting the cross-bore 330 returns to the reservoir 206. When the pressure in the central conduit 216 is below a predetermined amount, the spring 338 of the charge relief assembly 312 biases the poppet portion 336 against the plunger portion 316 to block flow out of the through-bore 328, as illustrated in FIG. 6. Thus, FIG. 6 illustrates the charge relief assembly 312 in a position to prevent the flow of fluid out of the central conduit 216.

FIG. 5 illustrates the bypass valve assembly 250 assembled into the hydraulic apparatus 200 and in the normal mode (unactuated) condition. When in the normal mode condition, the plunger portion 316 of the inner portion 254 of the bypass valve assembly 250 is spaced away from the head portions 240 of the valves 226 and 228. The locking pin 298 of the outer portion 252 of the bypass valve assembly 250 is located adjacent the first end 266 of the plug portion 260 in the axial extending portion 272 of the L-shaped slot 270.

Figure 8:
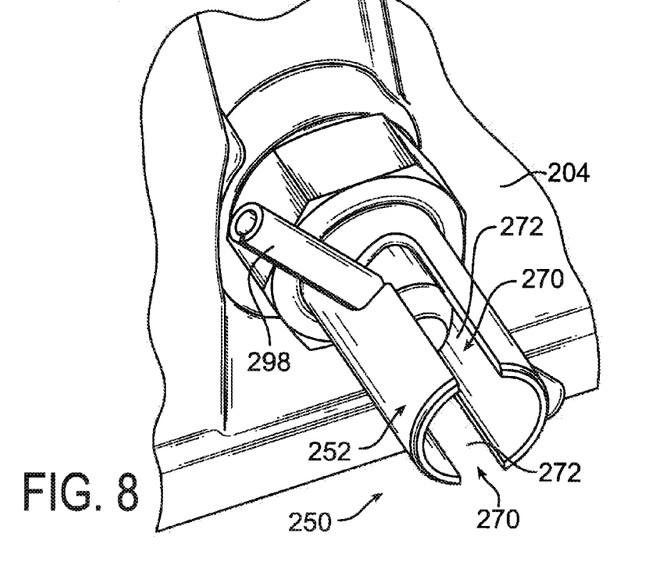
FIG. 8 is a perspective view illustrating the portion of the bypass valve assembly in a bypass mode condition.

To move the bypass valve assembly 250 into the bypass mode (actuated) condition, the locking pin 298 of the outer portion 252 of the bypass valve assembly 250 is moved toward the housing 204 and through the axial extending portion 272 of the L-shaped slots 270. The locking pin 298 then is moved radially relative to the plug portion 260 to rotate the locking pin into the radial extending portion 274 of the L-shaped slots 270. FIG. 8 illustrates the locking pin 298 located in the radial extending portion 274 of the L-shaped slots 270. When the locking pin 298 is moved through the axial extending portion 272 of the L-shaped slots 270, the plunger portion 262 of the outer portion 252 presses against the plunger portion 316 of the inner portion 254 to move the plunger portion 316 against the bias of the spring 346 and downwardly into the central conduit 216. Movement of the plunger portion 316 of the inner portion 254 into the central conduit 216 causes the frustoconical second end 320 of the plunger portion 316 to simultaneously engage the head portions 240 of the valves 226 and 228. Further downward movement of the plunger portion 316 causes the head portions 240 of the valves 226 and 228 to engage an outer surface of the shaft 322 of the plunger portion 316 of the inner portion 254 of the bypass valve assembly 250. This engagement with the outer surface of the shaft 322 moves the valve stems 238 and poppets 242 of each valve 226 and 228 toward their associated spring cap 232. This movement of the valves 226 and 228 is orthogonal relative to the axial movement of the plunger portion 316. As a result, the free-flow of fluid between the main conduits 212 and 214 and the central conduit 216 of the hydraulic apparatus 200 may occur. When the locking pin 298 is located in the radial extending portion 274 of the L-shaped slots 270, the inner portion 254 of the bypass valve assembly 250 is locked in the position illustrated in FIG. 6. In the position illustrated in FIG. 6, fluid may freely pass between the main conduits 212 and 214 and the central conduit 216 via the first and second passages 220 and 222 and, the hydraulic apparatus 200 is considered to be in a bypass mode condition.

When the hydraulic apparatus of the present invention forms a portion of a vehicle propulsion system, for example, of a turf machine, placing the hydraulic apparatus in the bypass mode condition for enabling the free-flow of fluid between the main conduits and the central conduit enables the turf machine to be towed or otherwise moved with little resistance from the hydraulic apparatus. The bypass valve assemblies of the present invention may be locked into the bypass mode condition. Additionally, linkages or other devices may be associated with the bypass valve assemblies for actuating the bypass valve assemblies from a remote location.

Although the principles, embodiments and operation of the present invention have been described in detail herein, this is not to be construed as being limited to the particular illustrative forms disclosed. It will thus become apparent to those skilled in the art that various modifications of the embodiments herein described may be made without departing from the scope of the invention.

What is claimed is:

1. A hydraulic apparatus comprising:
   a housing portion having two main conduits and a central conduit;
   valves supported in the housing portion, at least one valve interposed between each main conduit and the central conduit, each of the valves having a closed position for preventing a free flow of fluid between the central conduit and its associated main conduit and having an open position for enabling the free flow of fluid between the central conduit and its associated main conduit; and
   a bypass valve assembly having a plunger portion that extends into the central conduit, the plunger portion being movable in an axial direction for moving the valves from the closed position to the open position.

2. The hydraulic apparatus of claim 1 wherein the valves are oriented orthogonal to the axial direction, movement of the plunger portion of the bypass valve assembly in the axial direction resulting in a movement of the valves in the orthogonal direction.

3. The hydraulic apparatus of claim 1 wherein the plunger portion has a frustoconical outer surface portion for engaging the valves, axial movement of the plunger portion resulting in the frustoconical outer surface forcing the valves from the closed position to the open position.

4. The hydraulic apparatus of claim 3 wherein the plunger portion includes a widened portion, the frustoconical outer surface leading to the widened portion, the valves being in an open position when the widened portion of the plunger portion is in engagement with the valves.

5. The hydraulic apparatus of claim 4 wherein the widened portion is located at an axial end of the plunger portion, the frustoconical outer surface forming a transition from a shaft of the plunger portion to the widened portion, the shaft extending between the valves when the valves are in the closed position.

6. The hydraulic apparatus of claim 5 wherein the bypass valve assembly further includes a lever arm, the lever arm being associated with the plunger portion and pivotal movement of the lever arm moving the plunger portion axially for moving the valves from the closed position to the open position.

7. The hydraulic apparatus of claim 6 wherein, when the lever arm is pivoted by approximately ninety degrees, the bypass valve assembly is locked in a bypass mode condition in which the valves are in the open position.

8. The hydraulic apparatus of claim 5 wherein the bypass valve assembly further includes a plug portion, the shaft of the plunger portion extending through the plug portion, a spring interposed between the plug portion and the plunger portion for biasing the plunger portion away from the plug portion and into a normal mode condition in which the valves are in a closed position.

9. The hydraulic apparatus of claim 8 wherein the plug portion includes a surface with a concave indentation, a lever arm attached to the plunger portion and having an arcuate surface, the arcuate surface of the lever arm moving in a cam-like manner over the concave indentation of the surface of the plug portion to move the plunger portion in the axial direction.

10. The hydraulic apparatus of claim 1 wherein the plunger portion of the bypass valve assembly that is movable in the axial direction is adapted for connection to a linking device, the linking device enabling remote actuation of the bypass valve assembly.

11. The hydraulic apparatus of claim 1 wherein the housing portion is an end block portion located within an outer housing, the bypass valve assembly includes separate inner and outer portions, the inner portion including the plunger portion, the outer portion being attachable to the outer housing and being actuatable to move the inner portion.

12. The hydraulic apparatus of claim 11 wherein the valves are oriented orthogonal to the axial direction, movement of the inner portion of the bypass valve assembly in the axial-direction resulting in a movement of the valve in the orthogonal direction.

13. The hydraulic apparatus of claim 11 wherein the plunger portion of the inner portion of the bypass valve assembly has a frustoconical outer surface portion for engaging the valves, axial movement of the inner portion resulting in the frustoconical outer surface forcing the valves from the closed position to the open position.

14. The hydraulic apparatus of claim 11 wherein the central conduit receives charge fluid, the inner portion of the bypass valve assembly further includes a charge relief assembly adapted to relieve charge pressure from the central conduit.

15. The hydraulic apparatus of claim 14 wherein a through-bore extends through the plunger portion of the inner portion, the charge relief assembly including a poppet portion that is biased against the plunger portion for closing the through bore when charge pressure is below a predetermined amount, the poppet portion moving to enable a flow of fluid through the through bore when charge pressure exceeds the predetermined amount.

16. The hydraulic apparatus of claim 11 wherein the outer portion of the bypass valve assembly includes a plug portion and a second plunger portion, the plug portion being adapted to attach to the outer housing and the second plunger portion being movable in the axial direction relative to the plug portion for moving the plunger portion of the inner portion in the axial direction.

17. The hydraulic apparatus of claim 16 wherein the plug portion includes a generally L-shaped slot, a pin associated with the plunger portion being movable through the L-shaped slot when moving the bypass valve assembly between a normal mode condition and a bypass mode condition, the pin being positioned in a radial extending portion of the L-shaped slot for locking the bypass valve assembly in the bypass mode condition.

18. The hydraulic apparatus of claim 1 wherein the central conduit receives charge fluid, the bypass valve assembly further includes a charge relief assembly adapted to relieve charge pressure from the central conduit.

19. The hydraulic apparatus of claim 18 wherein the charge relief assembly includes a poppet portion that is biased into a first position when charge pressure in the central conduit is below a predetermined amount, the poppet portion moving from the first position to a second position for relieving the charge pressure from the central conduit when the charge pressure exceeds the predetermined amount.

* * * * *